G. G. AND E. L. VOLAND.
POST FOR SCALES.
APPLICATION FILED JULY 22, 1919.
1,350,189.
Patented Aug. 17, 1920.
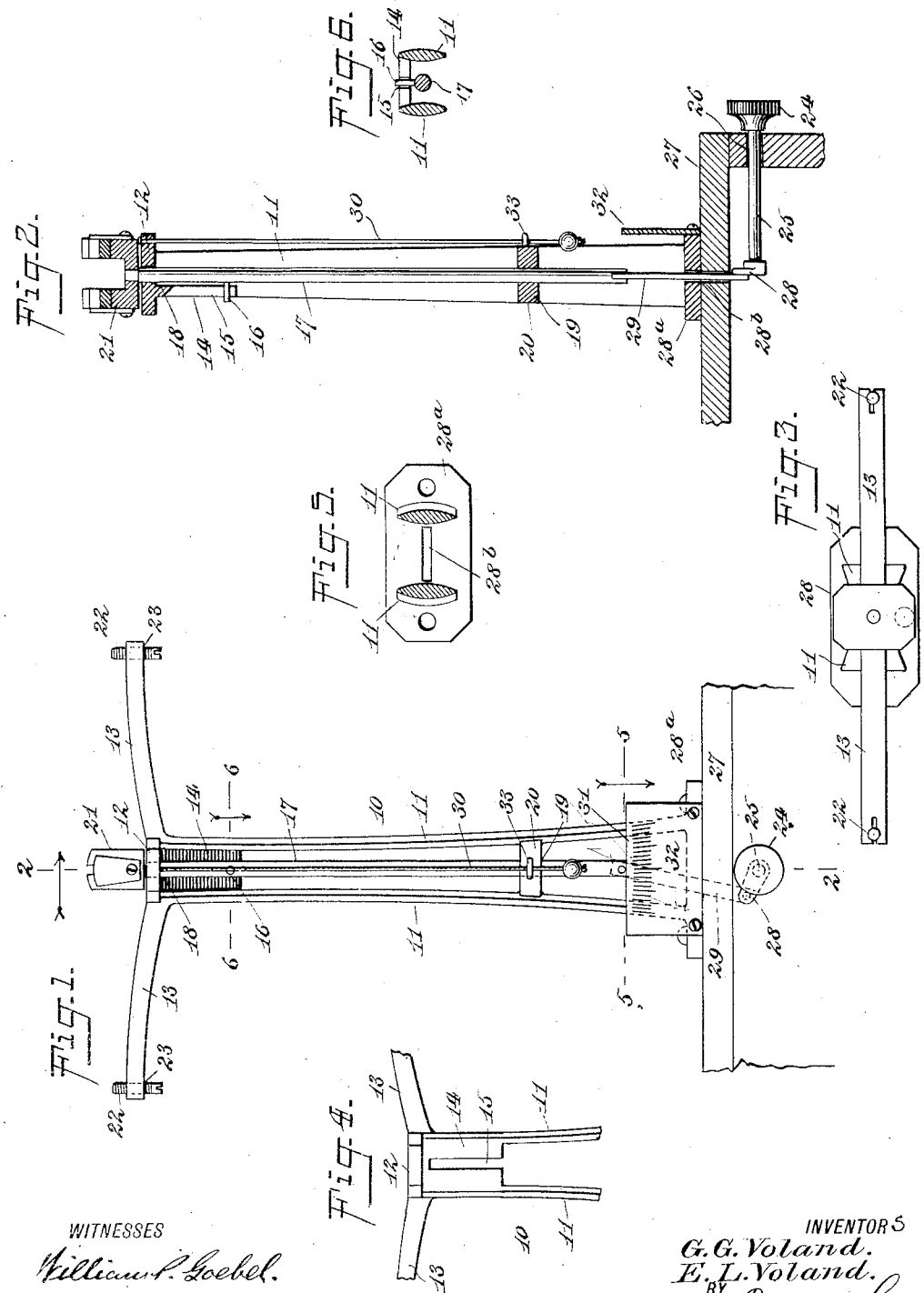
WITNESSES
William P. Goebel.
E. B. Marshall.
INVENTORS
G. G. Voland.
E. L. Voland.
BY Munn & Co
ATTORNEYS

UNITED STATES PATENT OFFICE.

GEORGE GOTTFRIED VOLAND AND EMIL L. VOLAND, OF NEW ROCHELLE, NEW YORK.

POST FOR SCALES.

1,350,189.  Specification of Letters Patent.  Patented Aug. 17, 1920.

Application filed July 22, 1919. Serial No. 312,625.

*To all whom it may concern:*

Be it known that we, GEORGE G. VOLAND and EMIL L. VOLAND, both citizens of the United States, and residents of New Rochelle, in the county of Westchester and State of New York, have invented a new and Improved Post for Scales, of which the following is a full, clear, and exact description.

This invention has for its object to provide an improved post for scales, having means to indicate when the post is in true vertical position.

Additional objects of the invention will appear in the following specification in which the preferred form of our invention is described.

In the drawings, similar reference characters refer to similar parts in all the views, in which—

Figure 1 is a front elevation showing our invention;

Fig. 2 is a sectional view on the line 2—2 of Fig. 1;

Fig. 3 is a plan view of Fig. 1 with the rod and the scale beam supporting means removed;

Fig. 4 is a fragmentary view showing the vertical slot in which the pin on the rod is slidably disposed;

Fig. 5 is a sectional view on the line 5—5 of Fig. 1; and

Fig. 6 is a sectional view on the line 6—6 of Fig. 1.

When scales are used which have arms extending from a base on which the scale beam is pivoted, in many different types of scales there is often great uncertainty as to whether the post which carries the scale beam is in true vertical position. Our improvement not only removes this uncertainty, but our post is also constructed in a neat and compact form, which will make it convenient to use the scale while making certain that the true weight may be conveniently determined.

By referring to the drawings, it will be seen that the post 10 has side members 11 which are spaced apart and which are connected at their upper ends by a transverse member 12 from which extends the arms 13 and depending portion 14; the depending portion 14 connecting the side members 11 and being provided with a vertical slot 15 in which moves a pin 16 extending rearwardly from a rod 17, sliding in a bearing or guideway 18 in the transverse member 12 and in a bearing or guideway 19 in another transverse member 20, which is disposed below the transverse member 12 and which also connects the side members 11 to the post 10.

Disposed above the transverse member 12 and carried by the rod 17, there is a scale beam carrying means 21, the scale beam carried by the said means 21 being of the usual type and with its arms resting on the screws 22 when the scale is not in use; the scale beam carrying means 21 resting on the member 12 when the scale is not in use. The screws 22 are disposed in threaded orifices 23 in the arms 13.

When it is desired to use the scale, the rod 17 is raised by means of a thumb piece 24 secured to a rod 25 journaled in a bearing 26 in a member 27 on which the post 10 is mounted. The post 10 has a base 28ª which rests on the member 27. The rod 25 has a crank 28 which is connected with the rod 17 by means of a link 29, which passes through a slot 28ᵇ in the base 28ª.

It will, therefore, be seen that when the scale is to be used, it is possible by means of the thumb piece 24 to rotate slightly the rod 25 which, by means of the crank 28 and the link 29 will raise the rod 17, so that the scale beam carrying means 21 will be raised from the transverse member 12 and the arms of the scale beam will be raised above the screws 22. The upward movement of the rod 17 and the scale beam carrying means 21 will be limited by the movement of the pin 16 in the slot 15.

As a means of determining the vertical position of the post 10, a plumb 30 is provided which is secured to the transverse member 12, it being possible to compare the position of the plumb 30 relatively to marks 31 on a scale 32 which is secured to the base 28, so that the true vertical position of the post may be observed at each weighing. The cord of the plumb 30 extends through a looped member 33 mounted on the transverse member 20.

Having thus described our invention, we claim as new and desire to secure by Letters Patent:

1. In a scale, a post having a vertical slot, two laterally extending arms, and guideways, a rod slidable in the guideways and having means for supporting a scale beam for coöperating with the arms, a plumb depending from the top of the post, there being a mark adjacent the base of the post with which the plumb may be compared, and a pin on the rod for movement in the vertical slot.

2. In a scale, a post having sides spaced apart, a top member connecting the upper ends of the sides and extending thereunder forming arms, the top member having a depending portion with a slot, a second member disposed above the first member and connecting the sides, there being guideways in the members, a rod slidable in the guideways and having means for supporting a scale beam for coöperating with the arms, and a pin on the rod for movement in the slot.

3. In a scale, a post having sides spaced apart, a top member connecting the upper ends of the sides and extending thereunder forming arms, the top member having a depending portion with a slot, a second member disposed above the first member and connecting the sides, there being guideways in the members, a rod slidable in the guideways and having means for supporting a scale beam for coöperating with the arms, a pin on the rod for movement in the slot, the plumb depending from the top member, and there being a mark adjacent the bottom of the post with which the plumb may be compared.

4. In a scale, a post having sides spaced apart, a top member connecting the upper ends of the sides and extending thereunder forming arms, the top member having a depending portion with a slot, a second member disposed above the first member and connecting the sides, there being guideways in the members, a rod slidable in the guideways and having means for supporting a scale beam for coöperating with the arms, a pin on the rod for movement in the slot, and means for raising the rod.

GEORGE GOTTFRIED VOLAND.
EMIL L. VOLAND.